United States Patent [19]
Robertson et al.

[11] Patent Number: 5,655,065
[45] Date of Patent: Aug. 5, 1997

[54] MASK GENERATOR USABLE WITH ADDRESSING SCHEMES IN EITHER BIG ENDIAN OR LITTLE ENDIAN FORMAT

[75] Inventors: Iain Robertson, Cople Village; Jonathan Jeacocke; Richard Simpson, both of Bedford, all of England

[73] Assignee: Texas Instruments Incorporated, Dallas, Tex.

[21] Appl. No.: 385,851

[22] Filed: Feb. 9, 1995

[30]  Foreign Application Priority Data

Feb. 9, 1994 [GB] United Kingdom ............... 9402470

[51] Int. Cl.$^6$ ................................................. G06F 15/00
[52] U.S. Cl. ................................................. 395/133
[58] Field of Search ............................... 395/130, 131, 395/135, 137, 138, 141, 133; 345/118, 121

[56]  References Cited

U.S. PATENT DOCUMENTS

| 5,265,214 | 11/1993 | Nitta | 395/122 |
| 5,271,097 | 12/1993 | Barker et al. | 395/135 |
| 5,297,243 | 3/1994 | Shiotani et al. | 395/135 |
| 5,442,737 | 8/1995 | Smith | 395/135 |
| 5,471,570 | 11/1995 | Rackley et al. | 395/135 |

*Primary Examiner*—Phu K. Nguyen
*Attorney, Agent, or Firm*—William E. Hiller; Richard L. Donaldson

[57]  ABSTRACT

A mask generator for use with at least first and second addressing schemes in a microprocessor system, wherein a first addressing scheme is in little endian format and a second addressing scheme is in big endian format. The mask generator, based upon data input as to the number of bytes to be written and the byte address of the first byte, will generate a mask containing as many contiguous 1's as there are bytes to be written. The byte address is then used to rotate the generated mask to align it accordingly with respect to the position of the bytes within the portion of the word that is to be written. The mask generator employs a simple 1's complement together with a specially generated term K for the most significant bit of the mask output, and the rotator is constructed with 0, 2 and 4 bit rotates in a first stage, and 0, 1, 4 and 5 bit rotates in a second stage. This approach enables a single generated mask with appropriate rotation function to serve for both big and little endian address formats without requiring an adder to perform a 2's complementing operation.

10 Claims, 3 Drawing Sheets

MASK GENERATOR USABLE WITH ADDRESSING SCHEMES IN EITHER BIG ENDIAN OR LITTLE ENDIAN FORMAT

The present invention relates to mask generation and in particular to a mask generation for selectively addressing locations in an addressable space, such as for example a memory array or devices which are bus connected or memory mapped.

Most microprocessors have wide databuses that allow them to access 4, 8 or even 16 bytes at a time from memory. The TI 486 DLC processor for example has a 32 bit wide data bus so that four eight bit bytes (two sixteen bit words) may be accessed at a time. However, it is not always required or desirable to write to all the bytes in a given memory word and a selective addressing mechanism may be employed ensure that only the desired bytes are written. This is typically achieved by having a separate write enable associated with each byte.

In order to be able to activate the particular write enables required, two pieces of information are necessary; namely the number of bytes to be written and the byte address of the first byte. The number of bytes may be used to generate a mask containing as many contiguous 1's as there are bytes to be written. The byte address is then used to rotate this mask to align it accordingly to the position of the bytes within the portion of the word that is to be written. Techniques for generating the mask and performing the rotation exist in the prior art.

There are two common addressing mechanisms, known as big endian and little endian. In the TI 486 DLC device for example the little endian format is used in which the low-order bits are in lowest (little end) address byte.

The addressing mode used by a microprocessor system affects the way in which the masking and rotating functions are implemented. Consider for example a number stored in a memory word, the left-most bit of the number being numerically more significant than the right-most.

In a big endian system, the byte with the lowest address in the word is numerically most significant (on the left), whereas the byte with the highest address within the word is numerically least significant (on the right). This means that bytes within a word are indexed from the left. For byte selection this system therefore requires a mask of 1's justified to the left, which is then rotated to the right (clockwise) to align it according to the byte address.

In a little endian system, the byte with the lowest address in the word is the numerically least significant (on the right), whereas the byte with the highest address within the word is the numerically most significant (on the left). This means that bytes within a word are indexed from the right. For byte selection this system therefore requires a mask of 1% justified to the right, which is then rotated to the left (anti clockwise) to align it according to the byte address.

There is a need for some devices to be able to deal with both addressing formats, and to this end the TI 486 DLC processor for example has an instruction BSWAP to convert data from one format to the other. Of course use of an instruction places a significant processing overhead on the use of the format not employed by the device and where both formats are to be supported a hardware solution is preferred in which both regimes of mask generator and rotation are provided. Some microprocessors for example are configurable to operate in either big or little endian modes, and in nonprogrammble devices only a hardware solution is possible.

There are presently several ways in which dual mode addressing might be achieved, for example:

Two completely separate mask generation and rotation circuits could be used; one for each endian. A multiplexer could then be used to select the appropriate one. This is simple, but expensive in terms of the amounts of hardware required.

Alternatively two mask generators could be employed but with a single rotator. A multiplexer could select the output from the left or right justified mask generators (according to the endian) as the input of the rotator. This uses less hardware however, the single rotator cannot rotate both clockwise and anti-clockwise; to perform this requires the rotate amount to be 2's complemented in one endian or the other. This is because a clockwise rotation of N places is equivalent to an anti-clockwise rotation of the (2's complement of N) places. The disadvantage here is that the 2's complement operation requires a subtraction which will increase the amount of time required to perform the operation. This many have a detrimental effect on the operating speed of the circuit. It will also offset some of the transistor savings made by the use of a single rotator.

Further reductions can be achieved if the same mask generator can be used to generate both the left and right justified masks. A mask generator which produces N 1's justified to the left can be thought of as also producing the 2's complement of N 0's justified to the right. Therefore, if the input to the mask generator is 2's complemented and the output inverted in one endian or the other, both mask configurations can be obtained. Again the disadvantage is that the 2's complement requires a subtraction which will slow down the circuit and offset some of the transistor savings.

According to the present invention in one aspect thereof, there is provided a mask generator as defined in the claims.

A particular advantage of the present invention is that it provides a mechanism whereby both big and little endian masking operations can be achieved from a single mask generator and rotator without the need for any 2's complement operations.

In order that the present invention may be better appreciated an embodiment will now be described by way of example only and with reference to the accompanying diagrammatic drawings of which:

Figure 1:
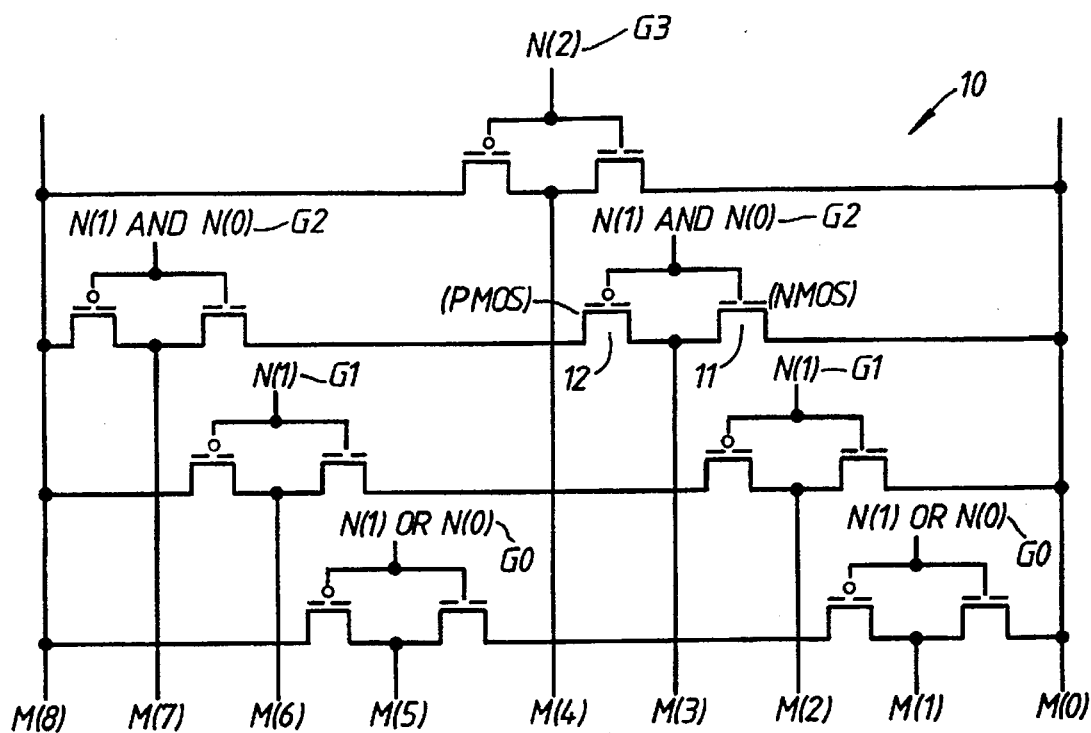
FIG. 1 shows a mask generator.

A mask generator cell 10 (FIG. 1) is formed in an integrated circuit, for example a micro-processor, of MOS transistors such as NMOS transistor 11 and PMOS transistor 12. The transistors are connected together as a combinational logic arrangement, the arrangement having three inputs; the left and right mask values, and a three bit value indicating the number of right mask bits, in binary. These are referred to as L R and N(2:0) respectively. The output, M, is 9 bits wide, of which the most and least significant bits are L and R respectively. In addition, all the outputs can be set to the same value by equating R and L. The truth table of the mask generator cell of FIG. 1 is given below.

| N(2:0) | M(8:0) |
|---|---|
| 000 | LLLLLLLLR |
| 001 | LLLLLLLRR |
| 010 | LLLLLLRRR |

-continued

| N(2:0) | M(8:0)    |
|--------|-----------|
| 011    | LLLLLRRRR |
| 100    | LLLLRRRRR |
| 101    | LLLRRRRRR |
| 110    | LLRRRRRRR |
| 111    | LRRRRRRRR |
| L = R  | RRRRRRRRR |
| R = L  | L LLLLL LLL |

The generator operates in response to four control signals (G0, G1, G2 and G3) logically derived from N(2:0) as follows:

G0=N(0) OR N(1)

G1=N(1)

G2=N(0) AND N(1)

G3=N(2)

It will be realised that this mask generator could be used in a dual mode system if M(8:1) were used to form the mask output and were subject to a two's complement in one endian or the other.

For example, in little endian, N(2:0)=001 will result in L L L L L L L R, however, in big endian, N(2:0)=001 must produce the result R L L L L L L L. This can be achieved when the input to the mask generator is 111, which is the 2's complement of N(2:0); i.e. $\overline{N(2:0)}$+1. However, the 2's complement would be relatively slow and expensive to implement since it requires a full adder.

The ideal truth tables for both little and big endian mask operations are shown in Table A and Table B below respectively. In both cases, N(2:0)=000 is defined to indicate 8 bits, rather than 0.

TABLE A

| N(2:0) | MASK     |
|--------|----------|
| 000    | 11111111 |
| 001    | 00000001 |
| 010    | 00000011 |
| 011    | 00000111 |
| 100    | 00001111 |
| 101    | 00011111 |
| 110    | 00111111 |
| 111    | 01111111 |

TABLE B

| N(2:0) | MASK     |
|--------|----------|
| 000    | 11111111 |
| 001    | 10000000 |
| 010    | 11000000 |
| 011    | 11100000 |
| 100    | 11110000 |
| 101    | 11111000 |
| 110    | 11111100 |
| 111    | 11111110 |

The little endian mask may be generated in accordance with the present invention by taking the outputs M(8:1) of the mask generator cell and constraining the input L= $\overline{N(2)}$& $\overline{N(1)}$& $\overline{N(0)}$ with R=1 (for little endian mode). The truth table for this is as follows:

| N(2:0) | R | L | M(8:0)    |
|--------|---|---|-----------|
| 000    | 1 | 1 | 111111111 |
| 001    | 1 | 0 | 000000011 |
| 010    | 1 | 0 | 000000111 |
| 011    | 1 | 0 | 000001111 |
| 100    | 1 | 0 | 000011111 |
| 110    | 1 | 0 | 001111111 |
| 111    | 1 | 0 | 011111111 |

The big endian mask may be generated by taking the outputs N(7:1) of the mask generator cell in response to N(2:0) together with an output K defined such that K=1 if the number of bytes is zero and constraining the input R= $\overline{N(2)}$& $\overline{N(1)}$& $\overline{N(0)}$ with L=1 (for big endian mode). The truth table for this mode is as follows:

| N(2:0) | $\overline{N(2:0)}$ | L | R | M(7:1)  | K |
|--------|---------------------|---|---|---------|---|
| 000    | 111                 | 1 | 1 | 1111111 | 1 |
| 001    | 110                 | 1 | 0 | 1000000 | 0 |
| 010    | 101                 | 1 | 0 | 1100000 | 0 |
| 011    | 100                 | 1 | 0 | 1110000 | 0 |
| 100    | 011                 | 1 | 0 | 1111000 | 0 |
| 101    | 010                 | 1 | 0 | 1111100 | 0 |
| 110    | 001                 | 1 | 0 | 1111110 | 0 |
| 111    | 000                 | 1 | 0 | 1111111 | 0 |

Figure 3:
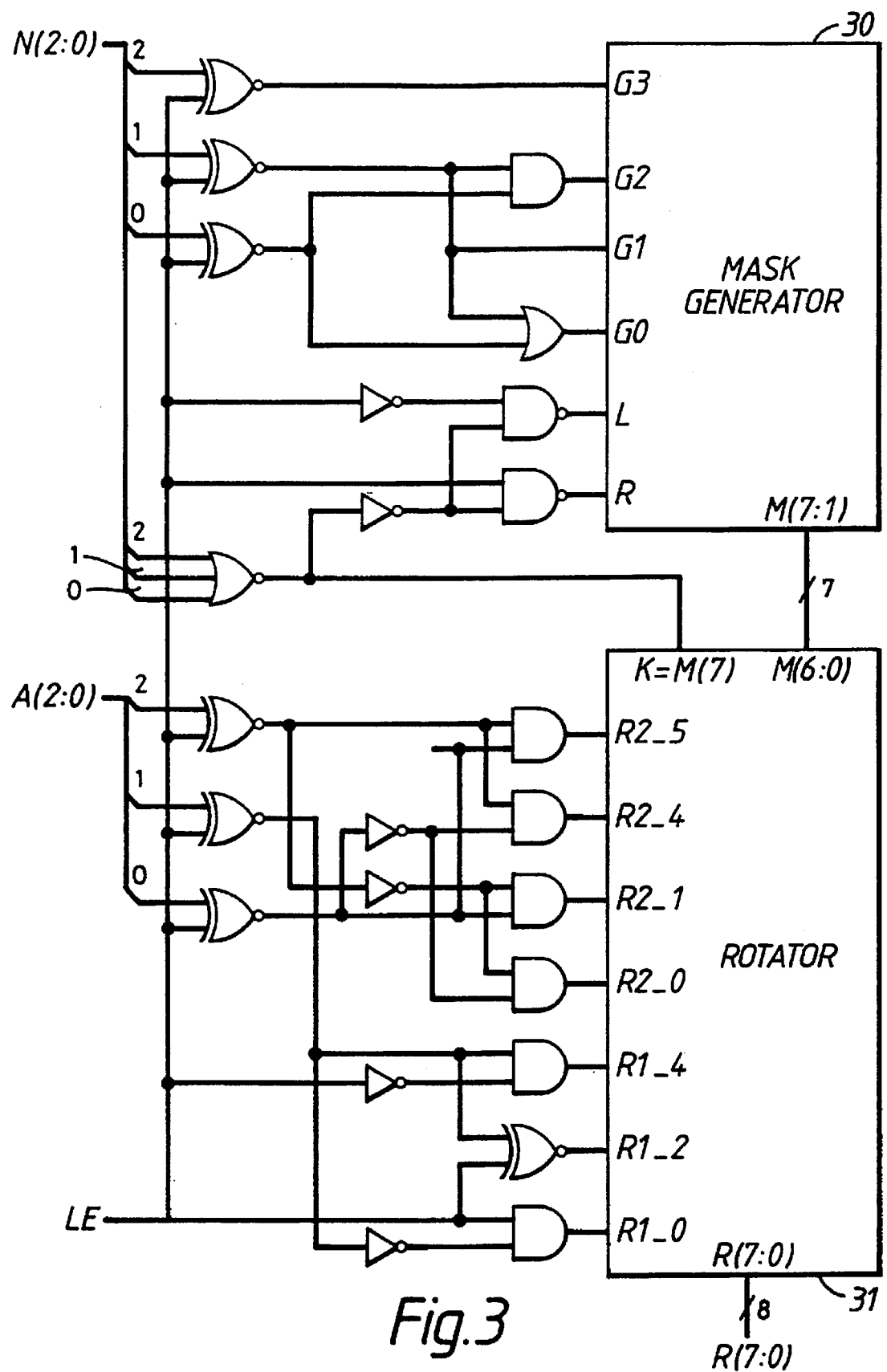
FIG. 3 shows a mask generator/rotator and control logic.

It will be observed that K is identical to the first bit M(8) of the mask generator cell in little endian mode. Taking K then bits M (7:1) of the cell as the output and given an input LE=1 (for little endian) and LE=0 (for big endian) so that L may be defined as (L=LR or K) and R may be defined as (R= $\overline{LE}$ or K), the combined truth table listed below as Table C may be constructed. A logical implementation of this is shown in FIG. 3, wherein the mask generator 30 and the rotator 31 may be identified.

TABLE C

| Number of Bytes | Little Endian (LE = 1) | | Big Endian (LE = 0) | |
|-----------------|--------|----------|---------------------|----------|
|                 | N(2:0) | K M(7:1) | $\overline{N(2:0)}$ | K M(7:1) |
| 000             | 000    | 11111111 | 111                 | 11111111 |
| 001             | 001    | 00000001 | 110                 | 01000000 |
| 010             | 010    | 00000011 | 101                 | 01100000 |
| 011             | 011    | 00000111 | 100                 | 01110000 |
| 100             | 100    | 00001111 | 011                 | 01111000 |
| 101             | 101    | 00011111 | 010                 | 01111100 |
| 110             | 110    | 00111111 | 001                 | 01111110 |
| 111             | 111    | 01111111 | 000                 | 01111111 |

It can be seen that the number of 1's in the mask is now correct for both big and little endian. However, the big endian mask needs to be rotated one place anti clockwise to align it correctly. In accordance with the present invention this is achieved in subsequent rotator logic which aligns the mask.

The mask rotation logic will now be described.

Having generated the mask above, it must be rotated according to the byte address of the 1st byte to be written. This is indicated by A(2:0), the byte alignment, in Table D below, which is the rotation logic truth table.

| Byte | Little Endian | | | | Big Endian | | | |
|---|---|---|---|---|---|---|---|---|
| Address | A(2:0) | 1st Stage | 2nd Stage | Rotate | A(2:0) | 1st Stage | 2nd Stage | Rotate |
| 000 | 000 | 0 | 0 | 0 | 111 | 4 | 5 | 9(−7) |
| 001 | 001 | 0 | 1 | 1 | 110 | 4 | 4 | 8(0) |
| 010 | 010 | 2 | 0 | 2 | 101 | 2 | 5 | 7(−1) |
| 011 | 011 | 2 | 1 | 3 | 100 | 2 | 4 | 6(−2) |
| 100 | 100 | 0 | 4 | 4 | 011 | 4 | 1 | 5(−3) |
| 101 | 101 | 0 | 5 | 5 | 010 | 4 | 0 | 4(−4) |
| 110 | 110 | 2 | 4 | 6 | 001 | 2 | 1 | 3(−5) |
| 111 | 111 | 2 | 5 | 7 | 000 | 2 | 0 | 2(−6) |

In little endian mode, the rotation must be anti clockwise by the alignment amount A(2:0). In big endian mode, the rotation must be clockwise, however, in the embodiment an anti-clockwise equivalent of the alignment amount, minus one to compensate for the fact that the mask is offset one place to the right.

Figure 2:
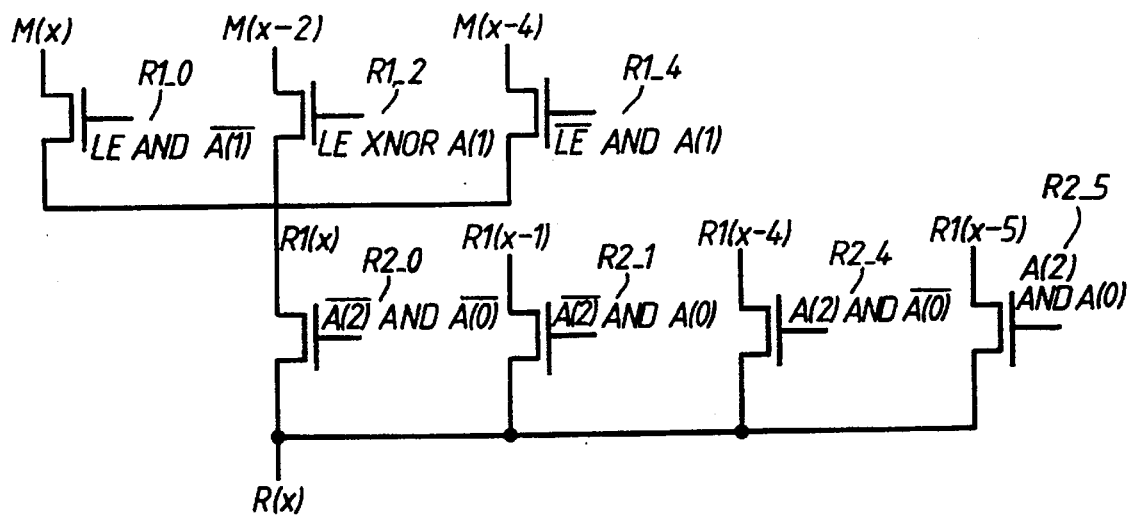
FIG. 2 shows a rotator.

In the prior art a typical implementation for an anti clockwise rotator might use two stages; the first to rotate by 0 or 1 place, and the second to rotate by 0, 2, 4 or 6 places. By connecting these in series, any rotation amount between 0 and 7 can be achieved. However, it will be realised that the some results can be achieved if the first stage rotates by 0 or 2 places, and the second by 0, 1, 4 or 5 places. Furthermore, by adding a 'rotate by 4' option to the first stage, the extra 2 bit rotation required for big endian can be achieved without increasing the delay through the rotator. In little endian mode, the first stage would rotate by either 0 or 2. In big endian, the first stage would rotate by either 2 or 4. FIG. 2 shows the schematic for one bit; 'bit x' of the rotator.

The embodiment described above shows how a mask generation and rotation function for both big and little endian can be performed using a single piece of hardware, and furthermore that this can be achieved without the need for an adder to perform a 2's complementing operation. Instead a simple and efficient 1's complement is used together with generating a special term, K, for the most significant bit of the mask output and constructing the rotator with 0, 2 and 4 bit rotates in the 1st stage, and 0, 1, 4 and 5 bit rotates in the 2nd. This only adds one extra transistor per bit to the rotator, and allows the extra 2-bit rotate required for big endian operation to be performed without affecting the performance.

As will be observed from the example of FIG. 3, the control logic required is minimal and much less than the full adder required by the prior art.

Figure 4:
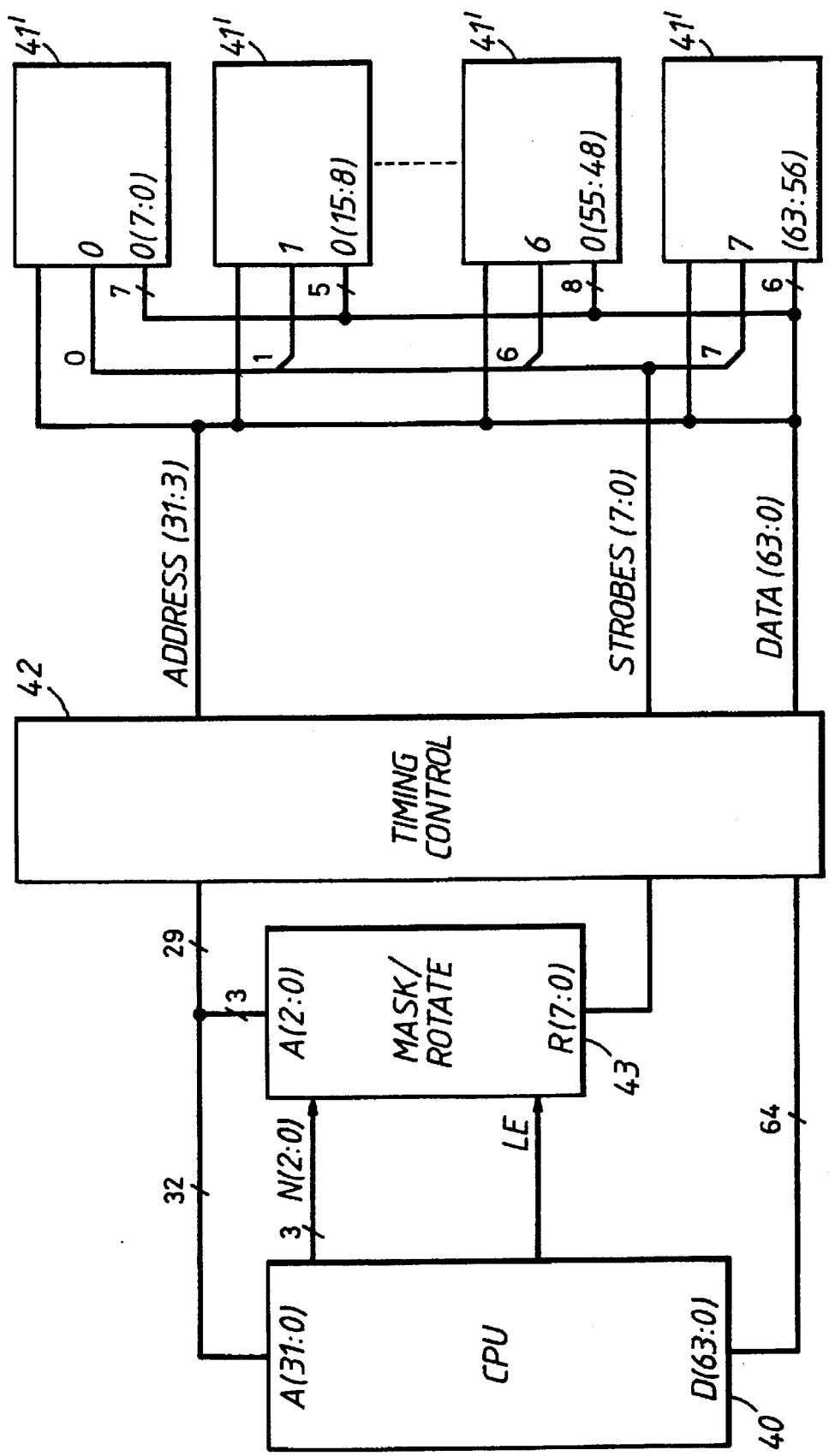
FIG. 4 shows the mask generator/rotator of FIG. 3 in a processor system arrangement.

The exemplary mask generator and rotator 43 (FIG. 4) thus far described may be used in a microprocessor arrangement in which a central processor 40 addresses an array of memory modules 41, in which data may be in either big endian or little endian format, via a timing control 42, other control signals being omitted for clarity of presentation.

The mask generator and/or rotator may be integrated into a semi-conductor device (integrated circuit) of larger functionality.

We claim:

1. A mask generator for generating a mask usable with at least first and second addressing schemes including:
    means for receiving control signals representative of a number of bytes to be masked,
    means for receiving a first mode signal or alternatively a second mode signal representative of a first addressing scheme or a second addressing scheme respectively,
    means responsive to a current one of said first and second mode signals for generating mask values corresponding to the current one of said first and second mode signals, and
    means responsive to said control signals for selectively placing said mask values at mask byte positions to generate said mask.

2. A mask generator as claimed in claim 1, and wherein a first mask value is derived from said control signal representative of the number of bytes to be masked, and a second mask value is derived from the current one of said first and second mode signals.

3. A mask generator as claimed in claim 1, and wherein the mask value at a predetermined bit position is derived from the mask values at the reminder of said byte positions.

4. A mask generator as claimed in claim 1, and including a rotator for rotating said mask a number of places derived from signals defining an alignment amount.

5. A mask generator as claimed in claim 4, and wherein said rotator operates in a first direction for the first addressing scheme and a second direction for the second addressing scheme.

6. A mask generator as claimed in claim 5, and wherein for said second addressing scheme said number of places is less than said alignment amount.

7. A mask generator as claimed in claim 1, and wherein said first addressing scheme is in little endian format and said second addressing scheme is in big endian format.

8. A mask generation processor comprising:
    an array of MOS transistors having respective control terminals and arranged in a plurality of rows;
    each of said rows including a plurality of said MOS transistors alternating between N-channel and P-channel transistors connected in serial relation;
    the control terminals of adjoining pairs of N-channel and P-channel transistors being connected to each other in common;
    a pair of serially connected N-channel and P-channel transistors having respective control terminals connected to each other in common and being separate from the pluralities of said MOS transistors included in each respective row;
    the commonly connected control terminals of said separate pair of serially connected N-channel and P-channel transistors being responsive to a first control signal respective of the number of right mask bits in binary;
    the commonly connected control terminals of respective adjoining pairs of N-channel and P-channel transistors included in respective rows being responsive to respective control signals which are the same with respect to each row but different from the control signals associated with other rows and from said first control signal and being representative of left and right mask values;
    means for receiving a first mode signal or alternatively a second mode signal respectively representative of a first addressing scheme or a second addressing scheme; and
    means responsive to the received one of said first and second mode signals for generating mask values corresponding thereto to produce the mask.

9. A mask generation processor as set forth in claim 8, further including a rotator for rotating said mask in a first direction for the first addressing scheme and in a second direction for the second addressing scheme.

10. A mask generator as set forth in claim 9, wherein said first addressing scheme is in little endian format and said second addressing scheme is in big endian format.

* * * * *